(12) United States Patent
Kynast et al.

(10) Patent No.: US 8,170,066 B2
(45) Date of Patent: May 1, 2012

(54) COMMUNICATION SYSTEM AND METHOD FOR SYNCHRONIZATION OF THE SAME

(75) Inventors: Rigobert Kynast, Loht am Main (DE);
Ludwig Leurs, Lohr am Main (DE);
Thomas Schmid, Hafenlohr (DE);
Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 942 days.

(21) Appl. No.: 11/247,673

(22) Filed: Oct. 11, 2005

(65) Prior Publication Data

US 2006/0083213 A1    Apr. 20, 2006

(30) Foreign Application Priority Data

Oct. 15, 2004    (DE) .................. 10 2004 050 423

(51) Int. Cl.
*H04J 3/06*    (2006.01)
(52) U.S. Cl. .................. 370/503; 370/304; 375/356
(58) Field of Classification Search .................. 370/350, 370/503; 379/350, 503
See application file for complete search history.

(56) References Cited

U.S. PATENT DOCUMENTS

| | | |
|---|---|---|
| 5,235,595 A | 8/1993 | O'Dowd |
| 5,859,837 A | 1/1999 | Crayford |
| 5,974,056 A | 10/1999 | Wilson et al. |
| 6,611,537 B1 * | 8/2003 | Edens et al. .................. 370/503 |
| 7,701,943 B2 * | 4/2010 | Harris et al. .................. 370/392 |
| 2001/0033255 A1 * | 10/2001 | Otsuka et al. .................. 345/60 |
| 2002/0105905 A1 * | 8/2002 | Boyle et al. .................. 370/229 |
| 2002/0110155 A1 * | 8/2002 | Pearce et al. .................. 370/519 |
| 2002/0131454 A1 | 9/2002 | Franke et al. |
| 2004/0123097 A1 * | 6/2004 | Ranjan .................. 713/153 |
| 2004/0233905 A1 * | 11/2004 | Weber .................. 370/389 |
| 2004/0250025 A1 * | 12/2004 | Bruckner et al. .................. 711/149 |
| 2004/0258097 A1 * | 12/2004 | Arnold et al. .................. 370/503 |
| 2005/0063396 A1 * | 3/2005 | Yu .................. 370/401 |

FOREIGN PATENT DOCUMENTS

| | | |
|---|---|---|
| DE | 38 56 239 T2 | 4/1999 |
| DE | 101 13 261 A1 | 9/2002 |
| EP | 0 784 393 A2 | 7/1997 |
| EP | 0 830 769 B1 | 3/1998 |
| WO | 02/078811 A1 | 10/2002 |

OTHER PUBLICATIONS

Tanenbaum Computer Networks, 4th Edition, Aug 9, 2002, Sections 1.2.1, 2.2.4, 3.2.2, 4.3.3.*

* cited by examiner

*Primary Examiner* — Jianye Wu
(74) *Attorney, Agent, or Firm* — Michael J. Striker

(57) ABSTRACT

With a method for synchronization in a communication system that includes a central participant and at least one further participant, at least one of the further participants being synchronized with the central participant, and, to this end, a telegram with synchronization information being transmitted by the central participant to the at least one further participant, particularly efficient synchronization of the at least one participant with the central participant results due to the fact that the telegram is a data telegram.

22 Claims, 2 Drawing Sheets

COMMUNICATION SYSTEM AND METHOD FOR SYNCHRONIZATION OF THE SAME

CROSS REFERENCE TO A RELATED APPLICATIONS

This application contains a subject matter which is similar to the subject matter disclosed in patent application Ser. Nos. 11/247,672, and 11/247,829.

BACKGROUND OF THE INVENTION

The present invention relates to a method for synchronization in a communication system that includes a central participant and at least one further participant, at least one of the further participants being synchronized with the central participant, and, to this end, a telegram containing synchronization information is transmitted by the central participant to the at least one further participant. The present invention further relates to a communication system and a corresponding automation system. Finally, the present invention relates to a telegram and a telegram structure.

With regard for the disclosure of the present application, reference is also made to the additional German patent applications submitted by the applicant simultaneously with the present patent application, entitled "Verfahren zur Synchronisation in einem Redundanten Kommunikationssystem" (*Method for Synchronization in a Communication System*) and "Verfahren zur Übertragung von Daten in einem Kommunikationssystem" (*Method for Transmitting Data in a Communication System*), the entire disclosure of which is included via this reference in the present application.

Communication systems are known in the related art. Distributed communication systems, in particular, are utilized in many technical applications. Distributed communication systems are used, e.g., in automation systems based on decentralized control and drive system engineering, in which a large number of individual systems are often controlled and driven in a temporally synchronized manner. An example of a single system of this type is a drive unit, e.g., a synchronous or asynchronous motor used to drive one of many axes that function in a manner such that they are mutually interpolating or closely interconnected. Typical fields of application of automation systems of this type based on decentralized control and drive system engineering are printing machines or machine tools, and robotic systems with a large number of temporally-harmonized conveying and operating elements.

Communication systems of this type include at least two, but usually many more participants, which are preferably configured and/or arranged in a hierarchical structure, with one participant being configured as the central participant and the remaining participants being configured and/or arranged as further participants in the communication system. A hierarchical architecture is known, e.g., as a master-slave structure with the central or main participant as the "master" or "master participant" (main station), and the further participants as "slaves" or "slave participants" (substations or secondary stations). The main participant is designed as the central participant that generates and sends control signals to the further participants. The further participants are in communication connection with the central participant and typically also with the other further participants to receive these control signals and for further communication as necessary. The slave participants are usually process interfaces, such as sensors and actuators, i.e., input/output assemblies for analog and digital signals, and drives. Signal processing, with data preprocessing, must be decentralized among the slave participants to keep the quantity of data to be transmitted low. This requires that the master participant and the further slave participants communicate with each other. In this regard, three basic architectures ("topologies") are known from the related art. They are illustrated in FIGS. 1 through 3. In FIG. 1, central participant M and further participants S1, S2, S3 are interconnected in a ring structure. A signal generated by central participant M travels around the ring and therefore passes each of the other participants S1, S2, and S3 in series. FIG. 2 shows a bus topology with a centralized bus line to which central participant M and further participants S1, S2 and S3 are connected. The signal and data transfer is accomplished via a data bus in a known manner. When the central bus line has long paths, it is common to interconnect a "repeater" R in the central bus line to amplify the signal. The third structure shown in FIG. 3 is a star architecture with a central switching element Sw (a "switch") integrated in the connecting line. A signal generated by central participant M is relayed via switching element Sw to participant S1 or S2 or S3 specified as the receiver.

The three topologies shown in FIGS. 1 through 3 can also be part of a more complex system in which a plurality of basic architecture designs are realized in an interconnected manner. In this case, one of the central participants or a superordinate central participant has the task of generating a superordinate control signal.

Distributed communication systems are also known from the related art, with which the master function can be transferred among a plurality of participants or even among all participants. A requirement of "multi-master" systems of this type is that a plurality of participants have the functionality of a central participant and that they exercise this functionality when a defined condition exists. In this process, a participant that previously served as a further participant becomes the central participant, and the previous central participant becomes the further participant in the communication system. A possible condition for a transfer of this type can be, e.g., the absence of a control signal from the previous central participant.

The applicant currently offers a distributed communication system of this type with a ring-type structure on the market, called the SERCOS Interface® (SErial Real Time COmmunication System). This system generates and sends control signals via a central participant to further participants. The further participants are typically connected with the central participant via optical waveguides. The SERCOS Interface® specifies strictly hierarchical communication. Data are exchanged in the form of data blocks, the "telegrams" or "frames", between the controller (master) and the substations (slaves) in temporally constant cycles. The further participants and/or substations do not communicate directly with each other. In addition, data contents are specified, i.e., the significance, depiction and functionality of the transmitted data are predefined to a significant extent. With the SERCOS Interface®, the master connects the controller to the ring, and a slave connects one or more substations (drives or I/O stations). A plurality of rings can be linked to one controller, with the controller being responsible for coordinating the individual rings with each other. This is not specified by the SERCOS Interface®. This communication system is preferably used for the closed-loop and open-loop control of distributed motors, e.g., synchronous or asynchronous motors. The further participants in the communication system are, therefore, the control devices for the closed-loop and open-loop control of a motor. The main applications for this communication system are, in particular, drives of machine tools, printing presses, operative machines, and machines used in general automation technology. With the SERCOS Interface® there are five different communication phases. The first four phases (phase 0 through phase 3) serve to initialize the participants, and the fifth phase (phase 4) is regular operation. Within one communication cycle, every substation exchanges data with the controller. Access to the ring is deterministic within collision-free transmission time slots. FIG. 4 shows a schematic depiction of the communication cycle of regular operation, i.e., communication phases 3 and 4 of the SERCOS Interface®. With the SERCOS Interface® there are three types of telegrams: Master Synchronization Telegrams, Acknowledge Telegrams and Master Data Telegrams. Master Synchronization Telegrams (MST) are sent out by the master participant. They contain a short data field, are used to define the communication phase and serve as the "clock". Acknowledge Telegrams (AT) are sent by slave participants and include, e.g., actual values of a drive controlled by the particular slave participant. Master Data Telegrams (MDT) are summation telegrams that contain data fields for all slave participants. The master uses Master Data Telegrams to transmit setpoint values to each slave. During initialization, every substation is notified of the beginning and length of its (sub-) data field. The SERCOS Interface® defines the following types of data, i.e., operating data, control and status information, and data transmitted in a non-cyclic manner. Operating data (process data) are transmitted in every cycle. Examples include setpoint values and actual values. The length of the operating data range is parameterizable. It is established during initialization and remains constant while the ring operates. The control information transmitted by the master participants to the slave participants, and the status information sent by the slave participants to the master participants are, e.g., release signals and "ready" messages. Data transmitted in a non-cyclic manner (service channel) include setting parameters, diagnostic data and warnings. Command sequences are also controlled via this non-cyclic transmission. As shown in the schematic depiction in FIG. 4, a communication cycle is started by the central participant sending out an MST. All communication-specific times are based on the end of this short (approx. 25 $\mu$s-long) telegram. The substations now send their Acknowledge Telegrams (ATi) in succession, in their respective transmission time slots, starting with $T_{1,i}$. After the last AT, the master sends the MDT, starting at $T_2$. The next cycle begins with another MST. The time interval between two MSTs is referred to as SERCOS cycle time $T_{SYNC}$. With the SERCOS Interface®, communication is synchronized with the end of the MST. A synchronization telegram is generated by the central participant—preferably at equidistant intervals—and fed into the communication ring. In the closed-loop controllers, a time parameter typically links receipt of the synchronization telegram and the synchronization signal with the processing of setpoint/actual values, which results in a determination and allocation of open-loop and closed-loop parameters to the particular servo motors.

Synchronization of the participants is of prime importance. If inaccuracies occur in the synchronization of the further participants with the central participant, the processes controlled by the further participants are not carried out in a synchronized manner. For example, the printed image produced by a printing press with servomotors controlled by a conventional communication system of this type can be blurred as a result of inadequate synchronization of the motion sequences. The same applies for machine tools or other automation machines that require highly-exact synchronization of processes. In the case of machine tools, for example, faulty synchronization can result in inexact machining of a workpiece, since, e.g., individual axes (e.g., x, y and z-axes) would move in a temporally unsynchronized manner.

The known synchronization using a dedicated Master Synchronization Telegram (MST) in every communication cycle has disadvantages in terms of protocol efficiency. The disadvantages are due to the fact that the central participant must generate and transmit two different types of telegrams, i.e., the Master Synchronization Telegram and the Master Data Telegram. The same applies for receipt by the further participants (slaves) of the communication system. Due, in particular, to the different types of telegrams sent out by the central participant during the communication cycle—the telegrams also differing considerably in terms of length—implementation of the communication system is complex in terms of hardware and software. Furthermore, the Master Synchronization Telegram (MST) transmitted separately in every communication cycle takes up time that is not available for transmitting operating data, thereby resulting in a loss of bandwidth.

SUMMARY OF THE INVENTION

The object of the present invention, therefore, is to avoid the disadvantages of the related art and, in particular, to realize a particularly efficient synchronization of the at least one participant with the central participant.

This object is obtained with a method of the type described initially by the fact that the telegram is a data telegram.

According to the present invention, in contrast to the related art, the synchronization information is therefore not transmitted in the form of a dedicated short Master Synchronization Telegram. Instead, the synchronization information is included in a data telegram, i.e., a telegram that transmits operating or process data from the central participant to the at least one further participant (or vice versa). The communication is thereby established based on the end of the synchronization information contained in the data telegram.

The data telegram is preferably a Master Data Telegram and contains setpoint values for process interfaces controlled by the at least one further participant, e.g., drives or input/output assemblies (I/O stations). The Master Data Telegram is a telegram that the central participant sends to the further participants in the communication system. Due to the typically very large number of further participants and, accordingly, the large quantity of control information to be transmitted to them, the main part of the Master Data Telegram is composed of this control information data, and the synchronization information which is also embedded typically makes up only a small portion of the data content.

Advantageously, the synchronization information is embedded in the data field of the data telegram. The Master Data Telegram preferably has the following fields: A preamble field, a destination address field, a source address field, a type field, a data field, and a checksum field, the checksum field of the data telegram including a checksum for the entire data telegram. In particular, the Master Data Telegram preferably contains the aforementioned fields in the order in which they were listed. In addition, further fields can also be provided, in particular at the beginning and end of the data stream transmitted by the central participant. The synchronization information is preferably embedded in the data field such that, with a Master Data Telegram designed as a summation telegram, the synchronization information is embedded in one or more subregions that are either connected or separated, and that are separated unambiguously and in a predefined manner from the telegram positions provided for data transmission to the further participants.

In terms of efficient implementation of the method according to the present invention, it is preferable for the synchronization information to be a subfield of the data field of the Master Data Telegram. In this manner, all of the synchronization information is summarized in one continuous subfield. The subfield containing the synchronization information is preferably the first entry in the data field in the Master Data Telegram. It is always preferable for the synchronization information to be located at the beginning of the Master Data Telegram, if possible, since the beginning of the telegram is received more quickly and is therefore available for further processing. Since the data field of the Master Data Telegram is also preferred in terms of embedding the synchronization information, a preferred positioning of the synchronization information results overall when it is the first and/or foremost entry in the data field, in particular directly after the type field in the Master Data Telegram.

It is furthermore preferred that the end of the subfield containing the synchronization information occurs at a specified time interval after the beginning of the data telegram. The specified time interval is known and constant and, in particular, is independent of the total length of the telegram. Since the beginning of the data telegram has a fixed reference to the instant of synchronization in the central participant, the time interval between the instant of synchronization in the central participant and the end of the synchronization information embedded in the Master Data Telegram is known. The synchronization time interval relative to the master clock pulse is therefore known, resulting in a constant instant at which triggering occurs, independently of the telegram length. In this manner, stable synchronization with a known time interval can be achieved.

The specified time interval is preferably in the range of a few microseconds. It is particularly preferable for the specified time interval to be approximately in the range of approximately two microseconds and, in particular, 2.24 microseconds. It is preferable to select a time interval in this range, since it allows all of the synchronization information to be transmitted, given the length of the synchronization information required based on experience. These time frames are also preferred because they enable the synchronization information to be present at the further participants at a sufficiently early stage in the communication cycle, thereby allowing evaluation of the synchronization information and further processing of the operating information contained in the Master Data Telegram to be carried out efficiently.

According to a preferred exemplary embodiment of the present invention, the synchronization information contained in the data telegram is protected by a dedicated checksum. Redundancy therefore results, since the Master Data Telegram is protected as a whole by a checksum and the synchronization information has its own, additional checksum, so to speak. The particular advantage of this embodiment lies in the fact that receipt of the synchronization information does not have to delayed until the entire Master Data Telegram—which can be considerably longer—is received, and the data is checked for corruption before the synchronization information is made available to the substations. The checksum for the synchronization information is also advantageous because, compared with the entire Master Data Telegram, the synchronization information is much less likely to be affected by a bit error. The likelihood of this occurring is reduced because the likelihood of a destroyed telegram or partial telegram with evenly-distributed bit errors is roughly proportional to the length of the telegram or partial telegram. Therefore, even if the Master Data Telegram as a whole is not usable—as was discovered in a check carried out for this purpose by the FCS checksum located at the end of the Master Data Telegram—synchronization can still be carried out properly, since the part of the Master Data Telegram located furthest to the front and containing the synchronization information was transmitted entirely without corruption in this case, as can be determined in certain circumstances based on the checksum for the synchronization information. The checksum can be designed to protect only the synchronization information. An embodiment of the present invention is preferred, however, with which the checksum covers the beginning of the data telegram up to and including the synchronization information. As a result, the initial fields of the Master Data Telegram, such as the preamble field, the destination address field, the source address field and the type field are also protected, as required by the communication protocol. The checksum is preferably a cyclic redundancy check located at the end of the subfield containing the synchronization information. With this embodiment, an independent synchronization telegram is therefore embedded in the Master Data Telegram. The "headers" of these two telegrams are the same, and both telegrams are protected independently of each other by a dedicated checksum. In addition, processing of each telegram can be started when the checksum is received.

The evaluation of the checksum is carried out in the at least one further participant preferably via comparison with previously-stored checksums for known data telegram entries. In contrast to the data content—which is variable due to the data field, in particular—and the variable quantity of data in the Master Data Telegram overall, checking the integrity of the transmitted data is simplified considerably in terms of protecting the synchronization information, since the quantity of possible data is limited and the data quantity is constant. The checksums can therefore be determined in advance, and the cyclic redundancy check for determining the correctness of the synchronization information can be carried out using a simple comparison. The amount of computing effort is reduced as a result.

In a particularly efficient embodiment of the present invention, the subfield containing the synchronization information contains the following fields, preferably in the order listed: A type field, a phase field, and a checksum field, the checksum field of the subfield including a checksum covering the beginning of the data telegram up to and including the phase field. The type of telegram is preferably specified in the type field. Due to the fact that the further participants must be synchronized with the central participant and the only requirement for this is that synchronization information be sent from the central participant to the further participants, the present invention also provides that the Acknowledge Telegrams have a corresponding structure. As a result, both telegram types, i.e., Master Data Telegrams and Acknowledge Telegrams, have the same format and/or structure in the communication system. It is preferred, in particular, that the Acknowledge Telegrams are not sent out individually by every secondary station, as is the case in the related art (refer to FIG. 4), but that they are configured as a summation telegram, as is the case with the Master Data Telegram. For this reason, there is preferably only one Acknowledge Telegram in which the individual substations enter, e.g., actual values of drives, in a field predefined for this purpose. To ensure that the Acknowledge Telegrams now have the same structure as the Master Data Telegram, it is preferable to provide a corresponding structure with a separate subfield at the beginning of the data field. The type field provided at the beginning of the subfield therefore specifies—in the case of this embodiment—whether the current telegram is a Master Data Telegram or an Acknowledge Telegram. Further preferred embodiments of the present invention are disclosed in the dependent claims.

The present invention, further features, objectives, advantages and possible applications of the same are described in greater detail below based on the description of preferred exemplary embodiments, with reference to the attached drawings. In the drawing, the same reference numerals refer to the same elements. All of the features described and/or depicted graphically represent the subject of the present invention, either alone or in any reasonable combination and, in fact, independently of their wording in the claims or their back-references. In the drawing:

DESCRIPTION OF THE PREFERRED EMBODIMENTS

Figure 1:
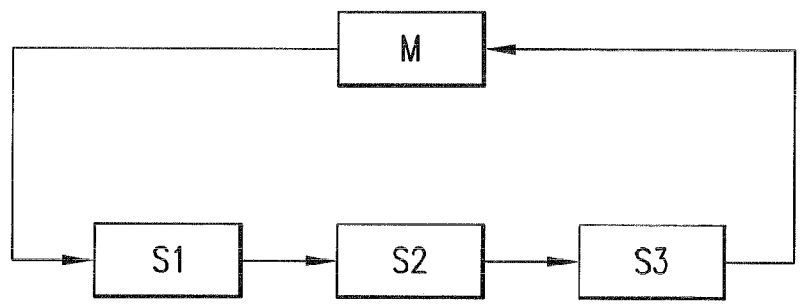
FIG. 1 Shows a schematic depiction of a communication system known from the related art, which is located in a ring structure.
Figure 2:
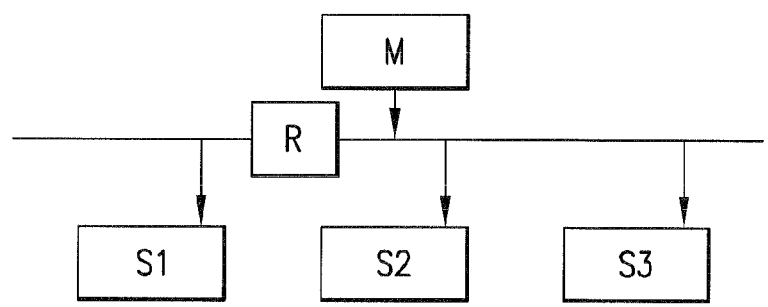
FIG. 2 Shows a schematic depiction of a communication system known from the related art, which is located in a bus topology.
Figure 3:
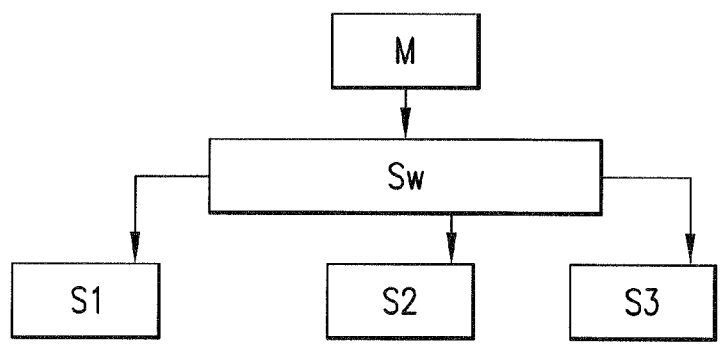
FIG. 3 Shows a schematic depiction of a communication system known from the related art, which is located in a star topology.
Figure 4:
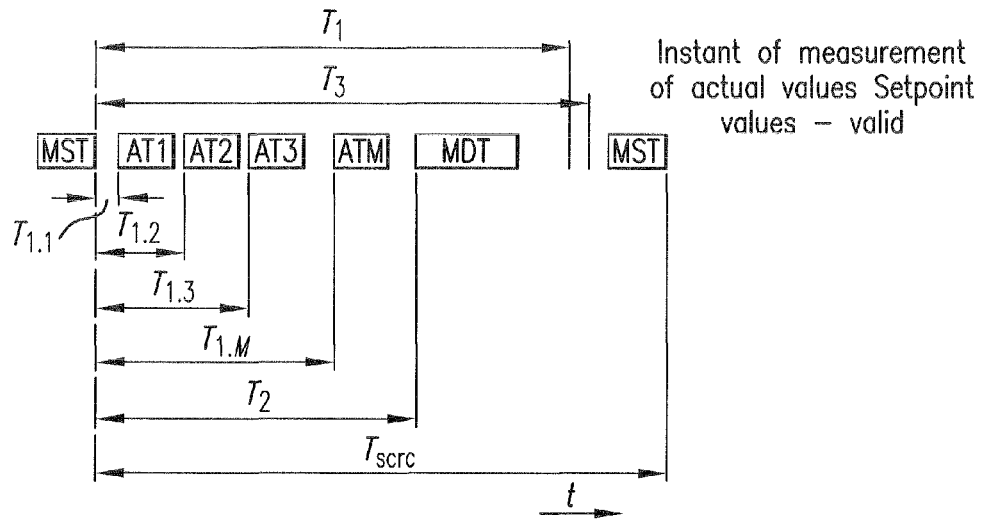
FIG. 4 Shows a schematic depiction of the phases of the communication cycle of the SERCOS Interface®—which is known from the related art—that are used for synchronization and regular operation.
Figure 5:
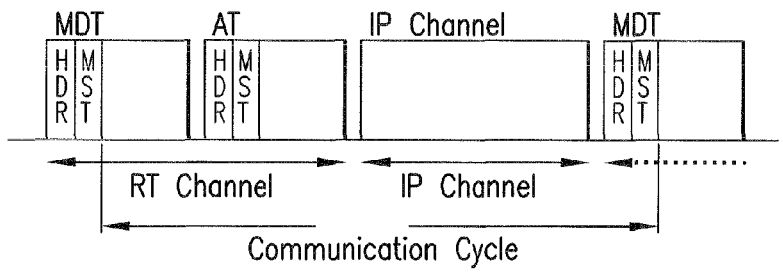
FIG. 5 Shows a schematic depiction of the phase of the communication cycle of the communication system according to the present invention used for synchronization and regular operation.

The operating phase of the communication of the communication system according to the present invention is depicted schematically in FIG. 5 in the case of cyclic communication. In FIG. 5 one can see that data telegrams are exchanged between a central participant or master participant (or main station) and at least one further participant (slave participant or sub- or secondary station). The central participant is the station with which the secondary stations are to be synchronized. The data telegram sent out by the central participant, e.g., along a ring (refer to FIG. 1), is labeled MDT (="Master Data Telegram"). The data telegram of the at least one secondary station is labeled AT (="Acknowledge Telegram"). FIG. 5 shows only an Acknowledge Telegram. This corresponds to a case in which only one further participant is provided (refer to FIG. 4), or in which the Acknowledge Telegram is configured as a summation telegram and includes corresponding telegram areas for a large number of further participants. Setpoint values for actuators to be controlled by the secondary stations are contained in the Master Data Telegram MDT, for example. The Acknowledge Telegram AT contains, e.g., corresponding actual values for replying to the central participant. According to the current exemplary embodiment of the present invention, the synchronization information is not in the form of a dedicated Master Synchronization Telegram MST (refer to FIG. 4). Instead the synchronization information is a data field MST in the Master Data Telegram MDT. The exact structure of the Master Data Telegram MDT is described in greater detail below with reference to FIG. 6. It has been noted, in this context, that the Master Synchronization Information Field MST is embedded at the beginning or in a front region of the Master Data Telegram MDT behind a header HDR. To simplify implementation of the communication system according to the present invention in the hardware and software, the Acknowledge Telegram AT has the same structure as the Master Data Telegram MDT, although the Acknowledge Telegram typically does not transmit synchronization information to the main station. This is advantageous, because both types of telegrams, i.e., MDT and ST, have the same offset in terms of the actual data, such as setpoint values and actual values. The part of the communication that includes the Master Data Telegram and at least one Acknowledge Telegram is labeled "RT channel" in FIG. 5. As an option, the communication cycle can contain an IP channel as well as this RT channel. The IP channel is a time slot for transmitting data encoded in accordance with the Internet protocol. The duration of the communication cycle is also shown in FIG. 5. In accordance with the duration of the communication cycle in the SERCOS Interface® (refer to FIG. 4)—in the case of which the duration is defined as extending from the end of one Master Synchronization Telegram to the end of the subsequent Master Synchronization Telegram—the communication cycle in the communication system of the present invention is defined as the "distance" from the end of the Master Synchronization Information Field of a Master Data Telegram to the end of the Master Synchronization Information Field of a subsequent Master Data Telegram. The next communication cycle therefore starts with the portion of the Master Data Telegram that follows the Master Synchronization Information Field, as indicated by the dotted arrow, which schematically represents the successive RT channel of the next cycle.

Figure 6:
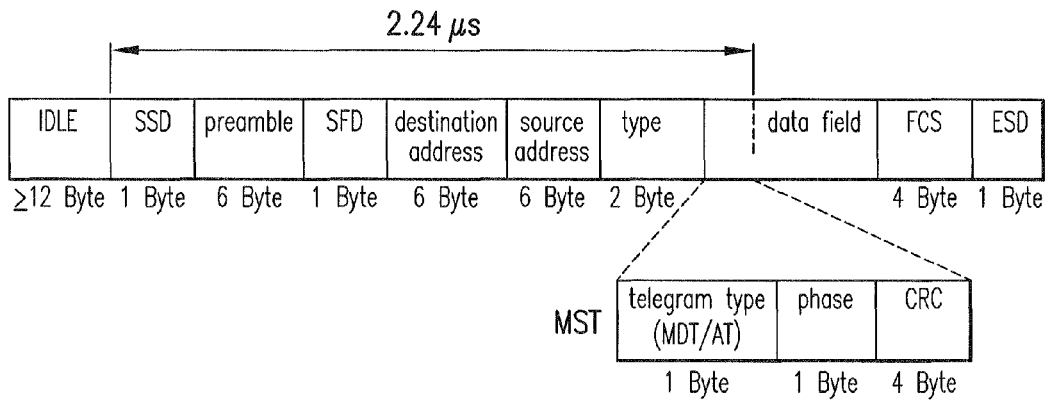
FIG. 6 Shows a schematic depiction of the telegram structure with embedded synchronization information of the communication system according to the present invention.

The structure of the Master Data Telegram is shown schematically in greater detail in FIG. 6. An idle phase ("IDLE") that is at least 12 bytes long is provided before the start of the actual Master Data Telegram. The Master Data Telegram startes with a data field that is 1 byte in length. It is referred to as SSD ("Start Stream Delimiter"). This is a prefix that delineates the start of a transmitted data stream. This is followed by a preamble with a length of 6 bytes. The preamble can have the function of providing a start-up time for the hardware of the electronics in the communication system according to the present invention to detect that a telegram has been transmitted. This is followed by a data field SFD ("Start Frame Delimiter") that delineates the start of the actual telegram or frame. The SFD field is 1 byte long. This is followed, in the Master Data Telegram, by the destination address and the source address for the telegram. Each of these two data fields has a length of 6 bytes. Following this is a type field which is 2 bytes long and is used to identify which type of network protocol is used in the subsequent data field. The data field itself comes next; its length is not specified exactly. For an Ethernet application, the data field can be up to 1,500 bytes long. The length of the data field typically depends on how many and which data are transmitted in the telegram. It is provided that an FCS ("Frame Check Sequence") checksum 4 bits in length follows the data field. The FCS field therefore contains a checksum that allows the integrity of the data in the entire telegram to be checked. The transmitted data are ended by the 1-byte long field ESD ("End Stream Delimiter"), which is a suffix and is the end of the transmitted data stream.

The Master Synchronization Information Field is a portion of the data field of the telegram according to the present invention. More precisely, it is embedded in the Master Synchronization Information Field at the beginning of the data field. The Master Synchronization Information Field has a constant length and has a starting field with a length of one byte, in which the telegram type is specified. In this field, it is specified in particular whether the current telegram is a Master Data Telegram MDT or an Acknowledge Telegram AT. As explained above, the synchronization information is only ever required for a Master Data Telegram, since the secondary stations are to be synchronized with the central participant (=master). To simplify implementation in hardware and software, however, it is preferable for the Acknowledge Telegrams to have the same structure as the Master Data Telegram. An Acknowledge Telegram can therefore also contain the Master Synchronization Information Field. For this case, the "Telegram type" field should therefore be filled with the information about the secondary station. The synchronization information itself is transmitted in a subsequent field ("phase") with a length of one byte. The Master Synchronization Information Field ends with a CRC field (="Cyclic Redundancy Check"), which uses a cyclic redundancy check to check the integrity of the data from the beginning of the data stream, i.e., from the SSD field to the phase field of the Master Synchronization Information Field. The CRC checksum is a unique number obtained by applying a polynomial to the bit pattern extending from the SSD field to the phase field. The same polynomial is used at the receiving station of the data telegram to generate a further checksum. The two checksums are compared to determine whether the transmitted data have been corrupted. As shown in FIG. 6, the end of a CRC field has a constant time interval from the beginning (start of the SSD field) of the Master Data Telegram. This constant time interval is preferably approximately a few microseconds long. In the exemplary embodiment shown, it is 2.24 microseconds long.

While the communication cycle and the structure of the Master Data Telegram were described in greater detail above with reference to FIGS. 5 and 6, the operation for synchronizing the further participants (slaves) with the central participant (master) will be described in greater detail below. The slave receives a Master Data Telegram MDT, from which it takes the synchronization information and the control information forwarded to it, e.g., in the form of setpoint values for electromechanical transducers (motors). The slave obtains the control information forwarded to it in the Master Data Telegram MDT by reading out the information entered in its assigned location of the Master Data Telegram MDT configured as a summation telegram. Since the Master Data Telegram MDT includes an "above all else checksum" FCS, typically at the end of the telegram, once the entire Master Data Telegram MDT is received, the validity of the entire data telegram is checked. The control information assigned to the slave is therefore available once the entire Master Data Telegram has been received and has been checked for corruption. In particular, since the length of the Master Data Telegram is not predefined (the "data field" can have a variable content with a length of up to 1,500 bytes), the instant at which the control information is available for the slave cannot be predicted exactly. The procedure applied for the synchronization information embedded in the Master Data Telegram according to the present invention is different. This synchronization information is not made available to the slaves via a dedicated Master Synchronization Telegram MST as it is with the related art. Instead, it is integrated as a subfield MST in the data field of the Master Data Telegram MDT. Since the embedded synchronization information is provided with a dedicated CRC checksum such that a portion of the Master Data Telegram is protected from the beginning up to and including the synchronization information (total length: 28 bytes, refer to FIG. 6), the synchronization information is evaluated immediately after the Master Data Telegram is received until the end of the subfield MST of the data field of the Master Data Telegram MDT. It is therefore not necessary for the entire Master Data Telegram to be received and checked for corruption. Since the end of the synchronization information, i.e., the end of the subfield MST, has a known constant and fixed interval from the beginning of the telegram—which, in particular, is independent of the total length of the Master Data Telegram MDT—the instant at which the synchronization information is available to the slave participant is known. Since, in turn, the beginning of the Master Data Telegram MDT has a fixed reference to the instant of synchronization in the central participant (master), the time interval between the instant of synchronization in the master and the end of the synchronization subfield MST, i.e., the end of the CRC field, is known. As a result, stable synchronization with a known time interval can be achieved. In particular, the synchronization—which is a prerequisite for controlling the drives and actuators—can be carried out before or at least in parallel, to a certain extent, with the receipt of the setpoint values. The monitoring and checking of the sub-telegram containing the synchronization information using the CRC field is much easier in terms of computing effort and can be carried out more quickly than the check of the entire Master Data Telegram MDT when the FCS checksum is used. This is due to the fact that the data fields of the sub-telegram containing the synchronization information, i.e., from the start of the Master Data Telegram MDT up to the CRC field of the synchronization sub-field MST, are known and are limited to a selection of relatively few possibilities for data entry. The CRC checksum can therefore be determined in advance, and the sub-telegram can be checked by performing a simple comparison. The CRC checksum is not altered by the remaining contents of the telegram. In contrast, to check the validity of the entire Master Data Telegram MDT, the FCS checksum of the entire telegram must first be determined with greater effort, since this depends, in particular, on the transmitted (variable) data contents, with reference to the data field in particular.

The present invention was explained in greater detail above with reference to preferred exemplary embodiments of the same. For one skilled in the art it is obvious, however, that different transformations and modifications can be made without deviating from the idea on which the present invention is based.

What is claimed is:

1. A method for synchronization in a serial, real-time communication system including a central participant and at least one further participant, comprising the steps of:

synchronizing the at least one further participant with the central participant by transmitting a Master Data Telegram formed to comprise operating or process data, including setpoint values for process interfaces controlled by the at least one further participant, and synchronization information including at least a dedicated checksum;

wherein said synchronization information is embedded in one or more subfields of a plurality of subfields comprising a data field of said Master Data Telegram, and wherein in a case where multiple subfields are required to embed all said synchronization information, each of the multiple subfields comprising said synchronization information are positioned either separated from or concatenated with each other within said data field, such that a portion of said Master Data Telegram is protected from a beginning up to and including the synchronization information, and wherein each position of the multiple subfields comprising said synchronization information within the data field is separately and unambiguously positioned in a predefined manner from subfield positions within said data field dedicated for data transmission only; and evaluating immediately after receipt of said Master Data Telegram only a portion of the bit string up to and including the one or more subfields comprising said synchronization information to obviate a need to first receive and then check the entire Master Data Telegram for corruption thereby expediting synchronization.

2. A method as defined in claim 1; and further comprising forming the at least one subfield containing the synchronization information as a first entry in the data field.

3. A method as defined in claim 1; and further comprising ending the at least one subfield containing the synchronization information at a specified time interval after a beginning of the data telegram.

4. A method as defined in claim 3; and further comprising using the specified time interval of substantially 2:s.

5. A method as defined in claim 3; and further comprising using the specified time interval of substantially 2.24:s.

6. A method as defined in claim 3; and further comprising making the specified time interval independent of a total length of the data telegram.

7. A method as defined in claim 1; and further comprising forming the checksum used to protect the synchronization information contained in the data telegram as a cyclic redundancy check.

8. A method as defined in claim 1; and further comprising covering by the checksum a beginning of the data telegram up to and including the synchronization information.

9. A method as defined in claim 1; and further comprising performing an evaluation of the checksum by the at least one further participant via a comparison with previously-stored checksums for known data telegram entries.

10. A method as defined in claim 1; and further comprising locating the checksum after the at least one subfield containing the synchronization information.

11. A method as defined in claim 1; and further comprising locating the checksum directly at an end of the at least one subfield containing the synchronization information.

12. A method as defined in claim 1; and further comprising providing a beginning of the data telegram with a fixed reference to an instant of synchronization in the central participant.

13. A method as defined in claim 1; and further comprising including in the data telegram a plurality of fields containing a preamble field, a destination address field, a source address field, a type field, a data field, and a checksum field, wherein a subfield with the synchronization information is located at a beginning of the data field, and a checksum field of the data telegram includes a checksum for an entire data telegram.

14. A method as defined in claim 1; and further comprising including in the at least one subfield with the synchronization information fields a type field, a phase field, and a checksum field, wherein the checksum field of the at least one subfield includes a checksum that covers a beginning of a data telegram up to and including the phase field.

15. A method as defined in claim 1; and further comprising evaluating the synchronization also when a checksum field of the at least one subfield is valid and the checksum field of the data telegram is invalid.

16. A method as defined in claim 1; and further comprising forming the data telegram as an amplifier telegram.

17. A method as defined in claim 7; and further comprising forming the data telegrams as Ethernet telegrams.

18. A communication system configured for serial, real-time communication, comprising
a central participant;
at least one further participant that is synchronized with a central participant by transmitting a Master Data Telegram formed to comprise operating or process data, including setpoint values for process interfaces controlled by the at least one further participant and synchronization information including at least a dedicated checksum,
wherein said synchronization information is embedded in at least one subfield of a plurality of subfields comprising a data field of said Master Data Telegram,
wherein in a case where multiple subfields are required to embed all said synchronization information, each of the multiple subfields are positioned either separated from or concatenated with each other within said data field such that a portion of said Master Data Telegram is protected from the beginning up to and including the plurality of subfields comprising the synchronization information,
wherein each position of each subfield of the multiple subfields comprising said synchronization information precedes and is separated unambiguously and in a predefined manner from subfield positions within said data field dedicated for data transmission only and
wherein the multiple subfields comprising said synchronization information are evaluated immediately after receipt of said Master Data Telegram until an end of said synchronization information to obviate a need to first receive and then check the entire Master Data Telegram for corruption thereby expediting synchronization.

19. A communication system as defined in claim 18, wherein a communication system is a distributed communication system for decentralized control with a master-slave structure.

20. A communication system as defined in claim 18, wherein the communication system is located in a structure selected from the group consisting of a ring structure, a linear bus topology, and a star topology.

21. A communication system as defined in claim 18, wherein the communication system is based on Ethernet physics.

22. An automation system, comprising a communication system configured for serial, real-time communication including a central participant and at least one further participant synchronized with a central participant by transmitting a Master Data Telegram formed to comprise operating or process data, including setpoint values for process interfaces controlled by the at least one further participant and synchronization information including at least a dedicated checksum,
wherein said synchronization information is embedded in at least one subfield of a plurality of subfields comprising a data field of said Master Data Telegram,
wherein in a case where multiple subfields are required to embed all said synchronization information, said multiple subfields are positioned either separated from or concatenated with each other within said data field,
wherein each position of said at least one subfield comprising said synchronization information is arranged to precede and is separated unambiguously and in a predefined manner from subfield positions in said data field comprising data only and
wherein only the at least one subfield comprising said synchronization information is evaluated immediately after receipt of said Master Data Telegram to obviate a need to first receive and then check the entire Master Data Telegram for corruption thereby expediting synchronization;

a control unit; and at least one further unit selected from the group consisting of an amplifier unit, an input unit, and an output unit, wherein said control unit is connected with the central participant, and at least one of said further units is connected with one of further participants.

* * * * *